US008468599B2

(12) United States Patent
McCusker et al.

(10) Patent No.: US 8,468,599 B2
(45) Date of Patent: Jun. 18, 2013

(54) SYSTEM AND METHOD FOR PRIVACY-ENHANCED CYBER DATA FUSION USING TEMPORAL-BEHAVIORAL AGGREGATION AND ANALYSIS

(75) Inventors: Owen McCusker, East Lyme, CT (US); Scott Brunza, Old Lyme, CT (US)

(73) Assignee: Sonalysts, Inc., Waterford, CT (US)

( * ) Notice: Subject to any disclaimer, the term of this patent is extended or adjusted under 35 U.S.C. 154(b) by 324 days.

(21) Appl. No.: 12/885,723

(22) Filed: Sep. 20, 2010

(65) Prior Publication Data

US 2012/0072983 A1 Mar. 22, 2012

(51) Int. Cl.
G06F 11/00 (2006.01)
G06F 12/14 (2006.01)
G06F 12/16 (2006.01)
G08B 23/00 (2006.01)

(52) U.S. Cl.
USPC .................... 726/22; 726/23; 726/24; 726/25

(58) Field of Classification Search
USPC ...................................... 726/22–25
See application file for complete search history.

(56) References Cited

U.S. PATENT DOCUMENTS

| | | | | |
|---|---|---|---|---|
| 6,535,850 | B1* | 3/2003 | Bayya | 704/239 |
| 7,970,701 | B2* | 6/2011 | Lewis et al. | 705/38 |
| 8,266,698 | B1* | 9/2012 | Seshardi et al. | 726/24 |
| 2006/0085854 | A1* | 4/2006 | Agrawal et al. | 726/23 |
| 2007/0113285 | A1* | 5/2007 | Flowers et al. | 726/23 |
| 2008/0028470 | A1* | 1/2008 | Remington et al. | 726/25 |
| 2008/0255898 | A1* | 10/2008 | Kuroda et al. | 705/7 |
| 2010/0050264 | A1* | 2/2010 | Aebig et al. | 726/25 |
| 2010/0082513 | A1* | 4/2010 | Liu | 706/46 |
| 2010/0115601 | A1* | 5/2010 | Brandstetter et al. | 726/11 |
| 2010/0199345 | A1* | 8/2010 | Nadir | 726/11 |
| 2010/0319069 | A1* | 12/2010 | Granstedt et al. | 726/22 |
| 2012/0011590 | A1* | 1/2012 | Donovan | 726/25 |

* cited by examiner

Primary Examiner — Jeffrey Pwu
Assistant Examiner — Jayesh Jhaveri
(74) Attorney, Agent, or Firm — Oblon, Spivak, McClelland, Maier & Neustadt, L.L.P.

(57) ABSTRACT

A method of determining, within a deployed environment over a data communication network, network threats and their associated behaviors. The method includes the steps of acquiring sensor data that identifies a specific contact, normalizing the acquired sensor data to generate transformed sensor data, deriving, for the specific contact from the transformed sensor data, a contact behavior feature vector for each of a plurality of time periods, determining, for the specific contact, scores associated with each of a plurality of classification modules to form a contact score vector, the contact score vector being independent of an identity of the specific contact, identifying a type of the specific contact based on the contact score vector, and determining a threat type, based on the contact behavioral profile and the contact score vector, when the specific contact is determined to be a threat in the identifying step.

14 Claims, 19 Drawing Sheets

Network Flow Record 801

```
unsigned int    _recIsIPv6;   // recored is IPv6
unsigned char   _srcIP[pcff::INETAddress::MaxAddressLength];    // source IP
unsigned char   _dstIP[pcff::INETAddress::MaxAddressLength];    // destination IP
unsigned char   _nextHopIP[pcff::INETAddress::MaxAddressLength];  // router next hop
unsigned int    _srcPort;    // source port
unsigned int    _dstPort;    // destination port
unsigned char   _icmpType;   //
unsigned char   _icmpCode;   //
unsigned int    _protocol;   //
unsigned int    _numPkts;    // number of packets in flow
unsigned int    _numBytes;   // number of total bytes in flow
unsigned char   _flags;      // OR of all flags in (Netflow flags)
unsigned char   _initialFlags;  // TCP flags for initial packet
unsigned char   _restFlags;  // TCP on non-initial packet
unsigned char   _tcpState;   // TCP state machine
unsigned int    _application;
long    _elapsedTimeSec;   // flow elapsed time
long    _elapsedTime;      // flow elapsed time
long long   _startTime;    // flow start time
long long   _endTime;      // flow end time
long    _sensorID;   // network flow sensor ID in ipfix record
long    _input;      // router incoming SNMP interface
long    _output;     // router outgoing SNMP interface
long    _class;      // flow class
long    _type;       // flow type
```

*Fig.15*

Generic IDS Alert 802

```
long _signatureID;
long _signatureRevision;
long _classificationID;
long _eventID;
long _refTime_timeVal_tv_sec;
long _refTime_timeVal_tv_usec;
char *_alertMsg; // variable...
long _val; // which fields are valid. (NULL is also valid)
long _packet_tv_sec; // seconds
long _packet_tv_usec; // microseconds
long _packetCaptureLen; // packet capture length
long _packetLen; // packet "real" length
long _dataLinkHdrOffset; // datalink header offset. e.g. ethernet
long _networkHdrOffset; // network header offset. e.g. ip
long _transportHdrOffset; // transport header offset e.g. tcp/udp/icmp
long _dataOffset; // data offset
unsigned char *_packet;
unsigned long _rawTestDataSize;
bool _bHaveNetworkDataInfo;
NetworkPacketInfo *_netPacketInfo;
```

```
Contact Behavioral Feature Vector 810
    float    _feature_1;    // mapped to flow count per unit time period e.g. flows/month
    float    _feature_2;    // mapped to total bytes per unit time period e.g. total bytes per month
    float    _feature_3;    // mapped to total packets per unit time period e.g. total packets per month
    float    _feature_4;    // mapped to total attacks per unit time period e.g. total attacks per month
    float    _feature_5;    // mapped to total attack downloads per unit time period e.g. total downloads per month
    float    _feature_6;    // mapped to total IDS alerts per unit time float    _feature_n;

Contact Behavioral Score Vector 820
    float    _behavioral_score_1;    // mapped to scanning behavior score
    float    _behavioral_score_2;    // mapped to known attack behavior score
    float    _behavioral_score_3;    // mapped to social score
    float    _behavioral_score_4;    // mapped to P2P score
    float    _behavioral_score_5;    // mapped to data exfiltration score
    float    _behavioral_score_6;    // mapped to payload entropy measure float    _behavioral_score_n;

Contact Behavioral Trust Score Vector 830
    float    _behavioral_score_1;    // mapped to scanning behavior trust score
    float    _behavioral_score_2;    // mapped to known attack behavior trust score
    float    _behavioral_score_3;    // mapped to social trust score
    float    _behavioral_score_4;    // mapped to P2P trust score
    float    _behavioral_score_5;    // mapped to data exfiltration trust score
    float    _behavioral_score_6;    // mapped to payload entropy trust score float    _behavioral_score_n;
```

FIG. 18

SYSTEM AND METHOD FOR PRIVACY-ENHANCED CYBER DATA FUSION USING TEMPORAL-BEHAVIORAL AGGREGATION AND ANALYSIS

FIELD

Embodiments described herein relate generally to network monitoring and network forensics, more specifically to a detection system that monitors network activity, comparing current network behaviors to historical and pre-stored behaviors that are used to identify suspicious network activity.

BACKGROUND

There is a profound need for innovative technology and operations that can defend networks against the growing complexity of network threats and insider attacks. Networks have become an integral part of a wide range of activities including business processes, government operations, and the national power grid. Within this net-centric environment, threats have evolved to be distributed, decentralized, and adaptable, operating over multiple time periods performing data exfiltration, denial of service, and phishing.

Network Intrusion Detection Systems (IDS) offer the ability to deter threats on networks and have traditionally taken the form of firewalls, antivirus software, spyware detection software, and a signature-based detection systems like Snort®. Network IDS systems can be categorized into misuse detection and anomaly detection systems. Anomaly detection capabilities are driven by the normative specification of user and system behaviors on a network that is considered operationally normal and non-threatening. Based on this normative specification, abnormal behaviors are identified by observing deviations from the established normal behavioral patterns. A prior knowledge of threats and their behaviors does not need to be specified before new types of threats can be detected.

Misuse detection and contrary anomaly detection are driven by the specification of the abnormal structural patterns and/or behaviors and is captured in terms of signatures. These systems apply pattern-matching methodologies on live data and known attack signatures to generate alarms. Generally speaking, these systems are deployed and operated in a single location, or single source, and do not match current complex distributed threat models operating well within the noise of everyday traffic.

Because the fundamental detection models that support defensive strategies have not evolved to match current threats, and are still "point source," we are unable to deter and/or anticipate attacks, making us vulnerable to attacks. Attacks on networks can lead to losses of capital, time, reputation, and intellectual property. Effective network monitoring that is built on a distributed defense model is needed to mitigate current complex threats.

Commercial research network defense technologies, and research and development programs, today fall into two categories: misuse detection and anomaly detection systems. These alert-centric technologies were created to protect the perimeter, deriving sensor events from a single ingress point of an enterprise network. In order to scale to the needs of botnet detection, correlation capabilities are needed to bring alerts together to define botnet behaviors derived from multiple ingress points and then correlate the alerts to a single botnet threat. BotHunter contains such a correlation engine needed to bring together events. Another system, Worminator, addresses the need for sharing alerts between detection nodes using a collaborative distributed intrusion methodology system. These systems connect communication events associated with distributed threats, like botnets, based on modeling the patterns between hosts within a network. Because of the variability in communication patterns, a system needs to employ parallel detection strategies to detect botnets.

There has been a wide range of anomaly detection behavioral models created in the past as, illustrated in the taxonomy shown in FIG. 2. These behavioral models are broken down into two broad types: a learnt model and a specification model. The learnt model employs unsupervised learning methods to discover anomalies without prior knowledge, while the specification model requires a description of the anomaly to detect known threats.

SUMMARY

In one embodiment, there is provided a method of determining, within a deployed environment over a data communication network, network threats and their associated behaviors, the method comprising: (1) acquiring sensor data that identifies a specific contact; (2) normalizing the acquired sensor data to generate transformed sensor data; (3) deriving, for the specific contact from the transformed sensor data, a contact behavior feature vector for each of a plurality of time periods; (4) determining, for the specific contact from the contact behavior feature vector, scores associated with each of a plurality of classification modules to form a contact score vector, the contact score vector being independent of an identity of the specific contact; (5) identifying a type of the specific contact based on the contact score vector; and (6) determining a threat type, based on the contact behavioral feature vector and the contact score vector, when the type of the specific contact is determined to be a threat in the identifying step.

According to one aspect of this embodiment, the method further includes deriving, for the specific contact from the transformed sensor data, a measure of trust and a measure of risk.

In one embodiment, the acquiring step includes acquiring the sensor data that identifies the contact, the contact being one of a host, a host group, a network, an autonomous system, and a country.

In another embodiment, the identifying step includes identifying the type of the specific contact, the type being one of normal, abnormal, threat, and unknown.

In another embodiment, the method further includes deriving a behavioral trust vector based on the contact score vector; and calculating a measure of trust of the specific contact based on the derived behavioral trust vector.

In yet another embodiment, the method includes determining whether the specific contact is an asset within the deployed environment or whether the specific contact is external to the deployed environment; and determining a set of trust and risk metrics based on whether the specific contact is the asset within the deployed environment or is external to the deployed environment.

In another embodiment, the normalizing step includes formatting the acquired sensor data into a predefined format; and removing address information from the acquired sensor data, and associating a unique, anonymous identification with the sensor data.

One embodiment described herein employs the use of a temporal aggregation methodology supporting two types of behavioral models: learnt and specified, used in the system. The methodology is threat-centric, focusing on aggregated behaviors associated with contacts, such as hosts, instead of being alert or alarm-centric like most technologies that have to process volumes of individual sensor events and data. The methodology supports a notion of an "in the dark" classification technique that does not require the identity of the contact begin analyzed to be known. Instead, aggregated behaviors associated with the contact are used. The methodology employs a cascading set of classification and correlation modules that are tuned to analyze specific behaviors associated with contact types. Lastly, the embodiment provides privacy enhancing data sharing and collaboration, allowing for the sharing of meaningful and actionable information without a notion of identity.

BRIEF DESCRIPTION OF THE DRAWINGS

The benefit and specific features of the disclosed embodiments will be made apparent in the detailed description taken in conjunction with the following diagrams, wherein:

FIG. 15 illustrates a structure of a normalized network flow record output from DCM 401;

FIG. 16 illustrates a structure of a normalized IDS alert output from the DCM 401;

FIG. 17 illustrates a structure of normalized honeypot attack data output from DCM 401;

FIG. 18 shows structures of behavioral features, scores, and trust scores; and

DETAILED DESCRIPTION

Figure 1:
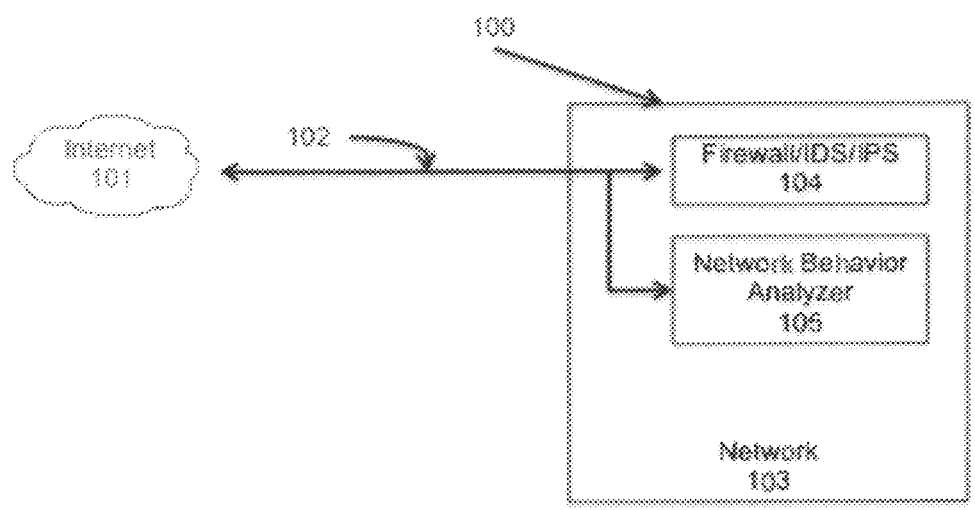
FIG. 1 is a system diagram illustrating convention network monitoring and detection capabilities including conventional alert/data-centric Network Behavioral Analyzer (NBA)
Figure 2:
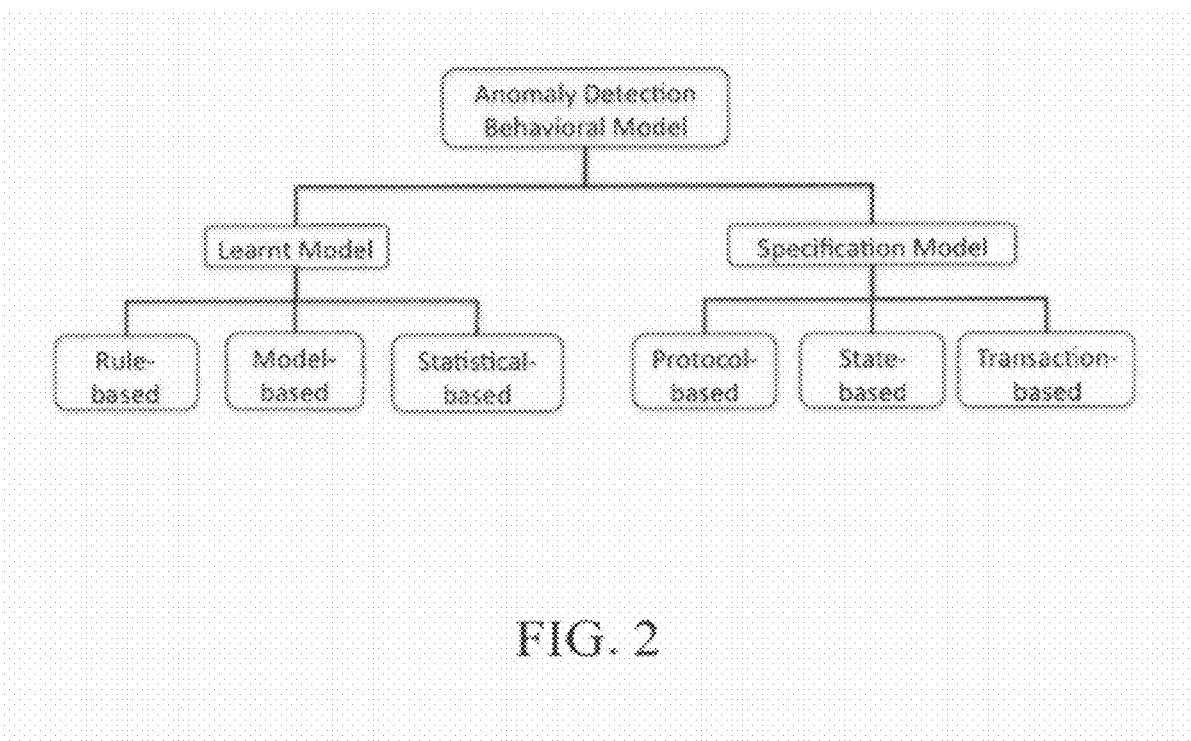
FIG. 2 is a diagram illustrating a taxonomy of anomaly detection behavioral models.

In one embodiment, a system provides an efficient, adaptable, and scalable method for detecting "low and slow" threats to enterprises providing integrated threat and risk management for cyber and physical security. Threats are detected by performing Temporal Aggregated Behavioral Analysis (TABA) on network data fused from sensors that are used to distinguish normal and abnormal behavior.

Most current technology is alert-centric, focusing on classifying and correlating each individual alert and raw data. Unlike these systems, one embodiment described herein is threat-centric and classifies and correlates various threats that can be represented by at least the following threat entities: hosts, host groups, networks, autonomous systems (AS), enterprises, terrorist groups, and countries.

Unlike current behavioral analysis capabilities, one embodiment includes a Behavioral Temporal Engine that is used to capture contact network behaviors over various multiple time periods, e.g., hours, days, week, years, cumulative. This facilitates the correlation of threat behaviors over a wide range of time periods.

Unlike current profiling, aggregated behavioral analysis does not rely on "identity" as a core aspect in the detection of threats, and instead classifies and correlates behaviors irrespective of identity. Sharing behaviors without identity facilitates the exchange of actionable information in real-time, system to system. TABA is not used to classify or correlate raw sensor data. Unlike previous types of behavioral analysis, TABA collects behavioral data into pre-determined time bins and then performs classification and correlation, instead of analyzing and classifying all data and events. TABA allows for a planned growth in behavioral data collected and driven solely by the number of behavioral features and the number of time bins. The volume of data collected by current behavioral analysis is arbitrarily driven by the raw data processed by the system.

Analyzing raw sensor data, e.g., network packets, is extremely resource intensive and is difficult to adapt to unknown threats. Instead, one embodiment has a data fusion capability that first creates a behavioral features space by aggregating and fusing behaviors derived from raw sensor data and events to various contacts, e.g., hosts. A contact is defined as either a physical or network object that is tracked by the system, such as, but not limited to: a host, a group of hosts, and/or a person. A contact can be determined to be a threat based on its behavior. This features space, and not the raw sensor data, is then analyzed for threat behaviors.

The aggregated behavioral feature space represents an N-dimensional structure capturing contact behaviors over a set of defined time periods: hour, day, week, month, year, cumulative, and/or a custom time period. This contact-centric feature space is scalable compared to conventional systems in that there is a known number of behaviors and time periods being collected per system. This is in stark contrast to the alert-centric conventional technology, in which there is a unknown number of alerts that are managed in the system over time by various contacts.

Aggregated behaviors on various contacts, e.g., hosts, and/or employees within an enterprise, are invaluable in its ability to provide indicators to changes in threat behavior.

Such a system acts as overlay and underlay technology, providing a unique perspective to existing defensive strategies ingesting data from existing sensors, and pushing threat indications to existing security information management systems. As an overlay to existing alert-centric sensors, e.g., Snort®, the system transforms the raw data into a host-centric perspective and fuses behaviors. As an underlay system to a Unified Threat Management (UTM) technology, the system can provide a unique behavior perspective correlated to existing alerts and data.

One embodiment disclosed herein manages contacts and threats using a set of defined behavioral primitives. These primitives can be discovered by the system and/or an analyst. A contact includes one or more behavioral primitives. A behavioral primitive fundamentally represents a region within a behavioral feature space. Behavioral primitives form the basis for a unique threat language that is used in this embodiment to detect a threat using syntactic pattern recognition methodologies.

The embodiment represents a meta-level sensing technology that transforms and aggregates raw events from a number of disparate sensor types. Also, the embodiment operates at multiple layers: behavioral, trust, and risk, and thus provides a basis for distributed defense by reducing the data being shared between detection systems. The embodiment communicates cyber and physical intelligence information to other systems, and to analysts via displays.

Turning now to the figures, FIG. 1 is simplified illustration of a conventional enterprise system 100. The enterprise 100 shown in FIG. 1 is for illustrative purposes only. System 100 could include the external Internet 101, enterprise network 103, firewall system and/or IDS/IPS or other similar device 104, and one or more connections to Internet 101. Enterprise network 103 could include a company, a group of companies, a department, etc. The cyber defense technology 104 is used to process and analyze raw packets and uses a set of rules and/or signatures to detect threats, e.g., botnets, viruses, and hackers.

Conventional Network Behavioral Analyzers 105 are alert/data-centric and operate on raw packet and flow data (801) without transforming the data into a host-centric perspective. The classes of algorithms within the Network Behavioral Analyzers 105 are tuned to process raw data and events. These approaches are referred to as alert/data-centric technologies herein to distinguish from the present embodiments, which are threat/contact-centric, wherein the methodology processes network contacts such as, but not limited to, hosts and their respective aggregated behaviors.

Figure 3:
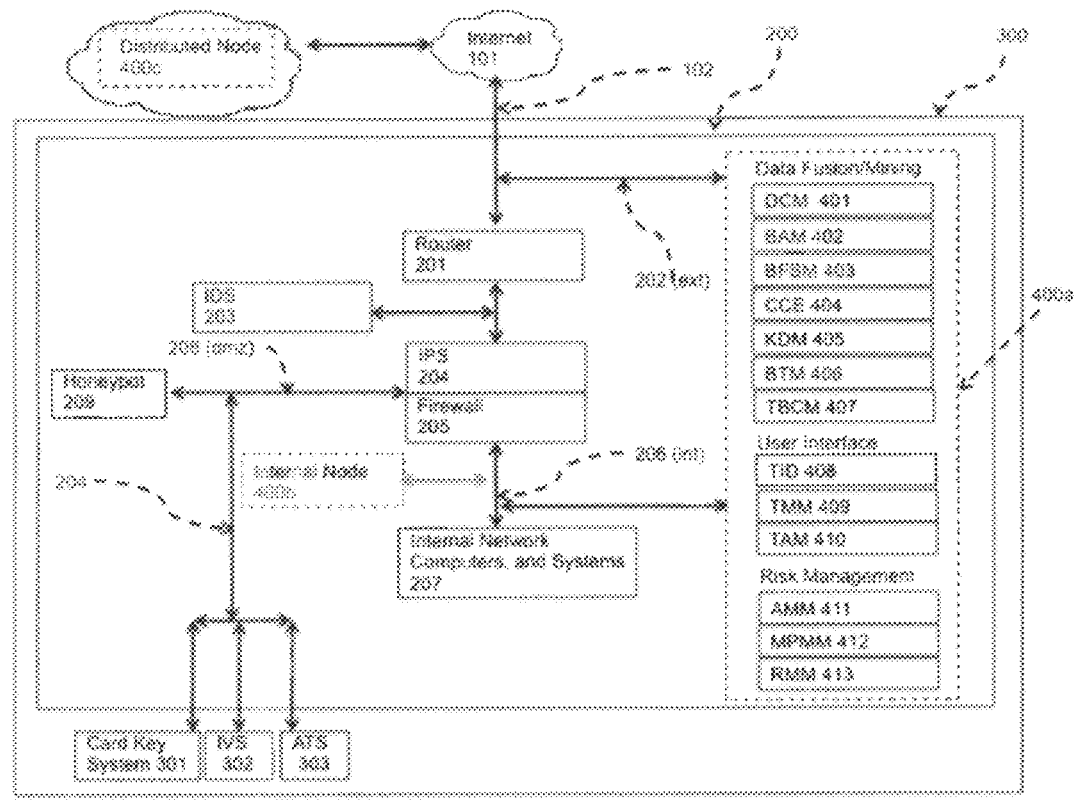
FIG. 3 is a system diagram illustrating the major components of the aggregated behavioral analysis capability presenting data collection, derivation of behaviors, classification, behavioral trust derivation, risk assessment, event notification and distribution.

The embodiment shown in FIG. 3 has a combined data fusion and knowledge discovery capability that is deployed within the network infrastructure (200) of an enterprise (300). The system follows and analyzes the behavior of various types of network contacts, including hosts, host groups, networks, autonomous systems (AS), and countries captured from the external network (202) and the internal network (206).

This embodiment provides a number of abstraction levels, moving from raw data to behaviors, then to trust, and finally risk. Behaviors are determined in the Behavioral Analysis Module (BAM) 402. Trust is determined in the Behavioral Trust Model (BTM) 406, while risk is determined in the Risk Management Module (RMM) 412. There are three principal parts to this embodiment: a combined fusion and mining system, supporting user interfaces, and a risk management system.

The Data Collection Module (DCM) 401 collects and transforms raw data from sensors into various internal formats as illustrated in FIGS. 15-17.

The Behavioral Aggregation Module (BAM) 402 creates a behavioral feature space from the transformed raw data. The structure of the contact behavior feature vector 810 is represented in FIG. 18. A behavioral feature vector 810 is derived from raw sensor data. One example of a feature within a behavioral feature vector is the variance in byte usage of a single contact during the aggregation of network flow over a fixed period of time.

The Behavioral Feature Space Module (BFSM) 403 manages behaviors collected for all of the contacts (also known as threat entities) being analyzed by the system.

Figure 13:
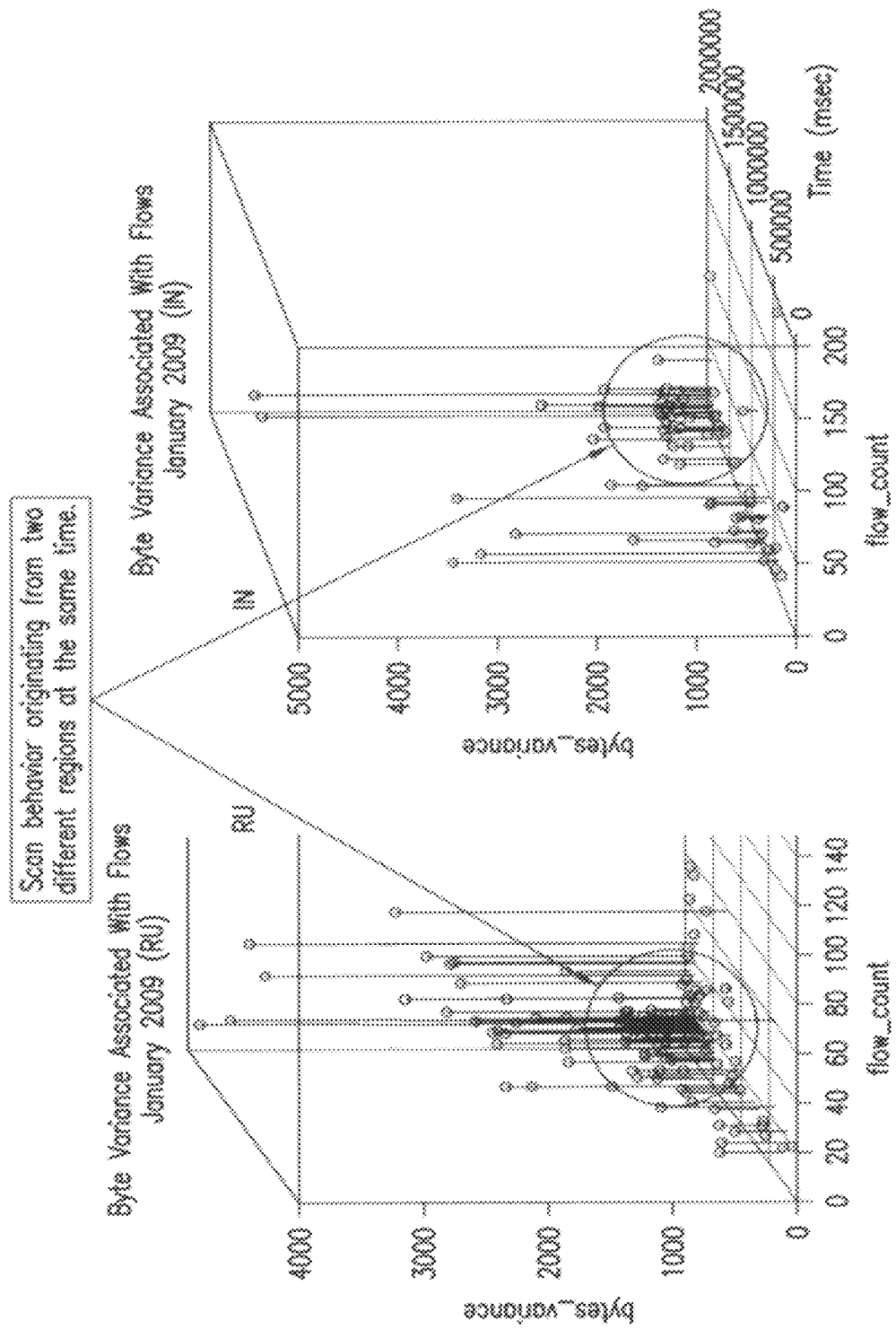
FIG. 13 is a visualization of the behavioral features space taking into account the localized behavior of host per country, wherein this view presents emergent behavior at the end of one month from Russia and India associated with port 445 scans (Conficker is known to use vulnerabilities associated with port 445)

The Classification and Correlation Engine (CCE) 404 represents a highly parallel system that functions using a diverse set of concurrent classification and correlation modules. The CCE operates on the shared behavioral data managed by the BFSM. The CCE 404 creates a vector of Contact Behavioral Score Vector (CBSV) 820, as illustrated in FIG. 18. The CBSV is created by the use of various algorithms operating on specific sets of one or more behavioral features, and are used to group contacts into regions measuring the distance of contacts from the center of these specified regions. In one specific view of the features space, FIG. 11 and FIG. 12, the classes of algorithms employed in one embodiment of the invention for deriving the CBSV are categorized under machine learning i.e. Learnt Model, and are statistically based. For example, we are employing the use of clustering algorithms (birch, k-means) to identify high-density regions within the feature space to derive the normative specification of a given network. We combine these techniques with time-based techniques that capture changes probability densities in those regions to refine the identification of these regions FIG. 13. Within this embodiment of the invention each of the discovered regions represent behavioral primitives. Each CBSV score is determined by the combination of the view, region within the view, the distance from the center of a region, and configuration parameters adjusting the score to a specific installation. A single contact can then have a number of behavioral scores representing it.

The Knowledge Discovery Module (KDM) 405 manages the set of pre-defined and discovered behavioral primitives that are used to describe and classify a threat. The algorithms used in the KDM (405) process behavioral primitives, and are fall under graphical analysis methodologies. A behavioral primitive is represented by a view, a region within a view, and the distance of the specific host from the "center" of that region or in the form of view.region.distance. A primitive found in view 1 (FIG. 11), region 1 (AOL behavior in FIG. 11), and a mathematical distance from the center within that region is then (1.1.233). In this embodiment of the invention a threat is represented as a graph of behavioral primitives, where each behavioral primitive is derived from the views, its regions and distances within the overall behavioral feature space, and then in turn, the behavioral features space is derived from the raw network data and sensor events over various time periods.

The Behavioral Trust Module (BTM) 406 measures trust from the behaviors derived from network contacts. The behavioral trust values are partly driven by the security policies that exist in the deployed environment, and the structure of a Contact Behavioral Trust Vector Score Vector (CBTVS) 830 is illustrated in FIG. 18. The CBTVS 830, which includes classified behavior trust elements 831, 832, etc., is used to derive the overall behavioral trustworthiness of the contact.

The Threat Behavioral Collaboration Module (TBCM) 407 distributes threat CBSVs 820 subscribed to by other existing detection nodes, providing a distributed defense capability.

This embodiment includes three user interface components that support indication, analysis, and mitigation. For indication, the Threat Indicator Dashboard (TID) 408 is used to visualize indication of threats, which are prioritized by their untrustworthiness. Threat analysis is done by visualizations in the TAM 410. Further, the Threat Management Module (TMM) 409 provides a mechanism to manage threats and mitigate them for the analyst.

Risk is derived and managed from the Asset Management Module (AMM) 411, Mission/Process Management Module (MPMM) 412, and the Risk Management Module (RMM) 413.

Figure 4:
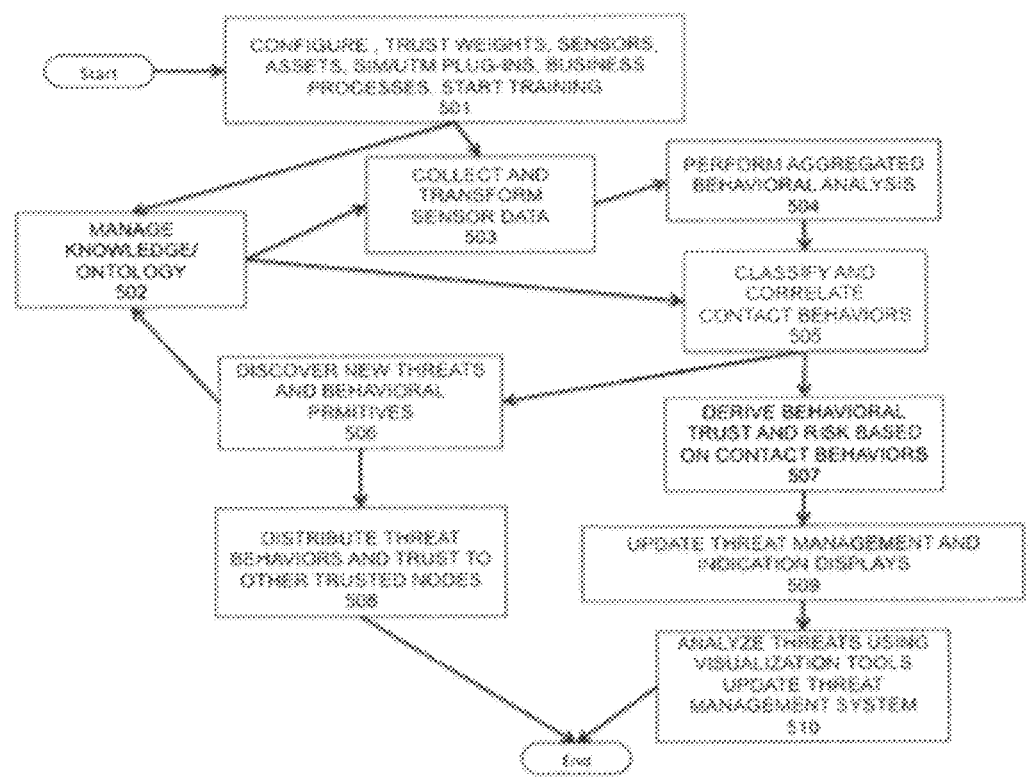
FIG. 4 is a method diagram capturing the overall methodology of the system.

FIG. 4 illustrates a method according to one embodiment, wherein various steps are performed in parallel.

Step 501 is the configuration step, which includes setting behavioral trust weights according to the security policies deployed environment, configuring network assets, and configuring risk management by mapping business processes and missions to configured assets. When a network infrastructure asset, like an application server supporting critical financial web services, is threatened by one or more cyber threats, the business processes using that asset are now at risk. A near real-time value of risk is derived based on the security policies within an organization driving the configuration of trust weights associated with specific network behaviors and those behaviors detected by the system and found acting on those specific assets. A business process or mission that is supported by multiple assets that all are found to have threat behaviors with low trust scores will have a higher risk value than that of a different business process or mission that only has one asset, with a high trust score (i.e. the behaviors are trusted by the organization) derived from the contact behavioral feature vector for the asset. This step also includes setting the mode of operation to a pre-defined setting, including, but not limited to the modes of: generic, asset monitoring (excluding dark-space behaviors), data exfiltration, and botnet.

Figure 11:
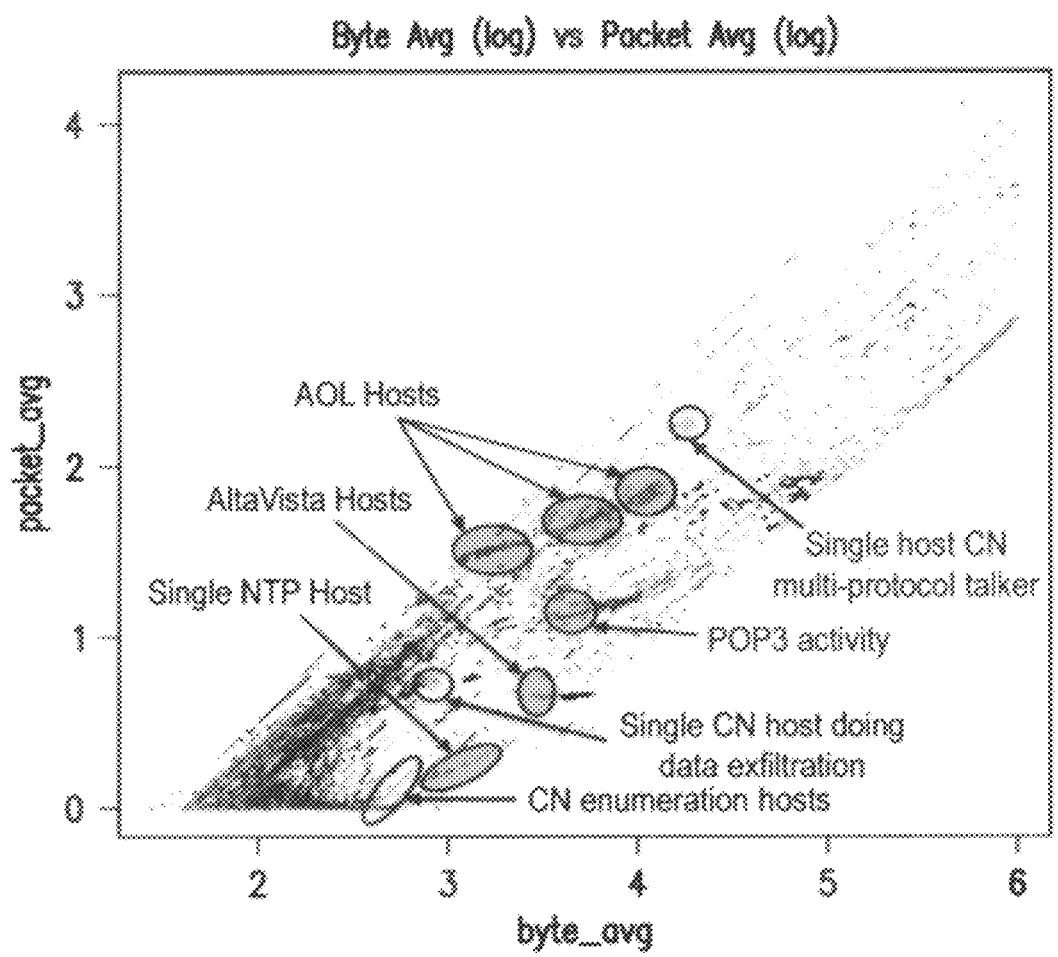
FIG. 11 is a visualization of the behavioral features space managed by the BFSM presenting known regions within that view of the features space, wherein each dot within this visualization represents an individual host where there are over 500K being managed in one month and one Chinese (CN) host was found to be performing data exfiltration to China in that month out of 500K.
Figure 12A:
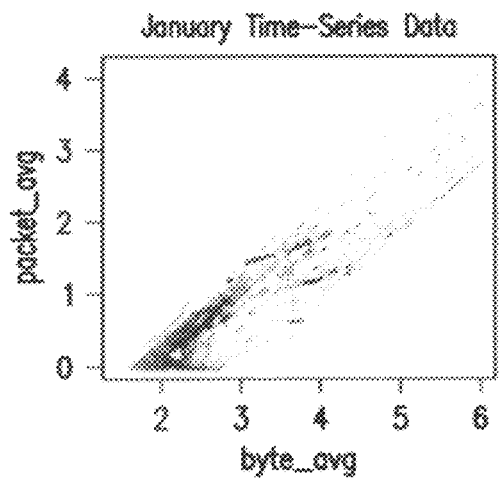
FIG. 12 is a visualization of the behavioral feature space managed by the BFSM presenting how the normative specification of a deployed environment can be realized over multiple months.
Figure 12B:
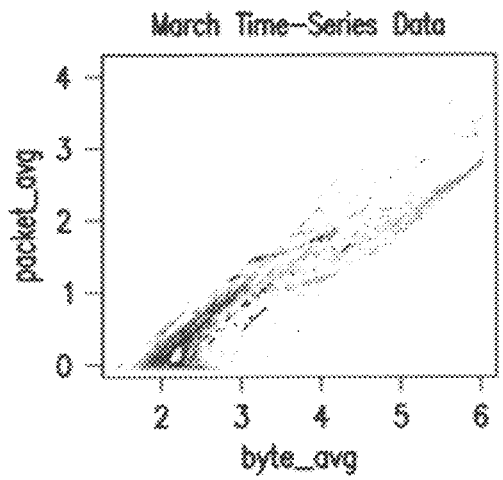
Figure 12C:
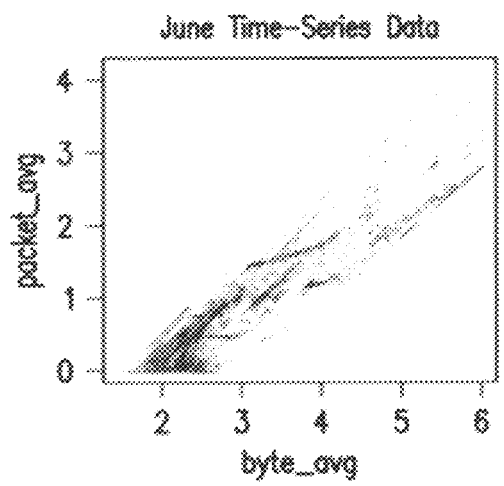
Figure 12D:
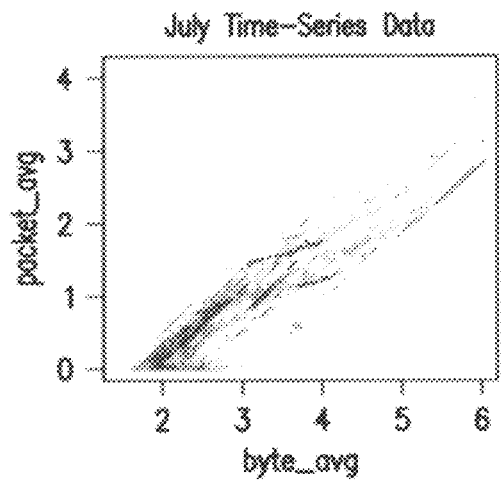

Further, in step 501, a training task is initiated to create a normative specification of the deployed environment. This step identifies regions in terms of distance measures, contact densities, and rates of change in density over time within various views of the features space identifying them as either normal, abnormal, threat, or unknown behaviors. A contact can be within more than one region within different time periods. A predefined set of behaviors can then be applied to the normative specification of the environment to identify known regions, as illustrated in FIG. 11. This view of the feature space illustrates that AOL traffic can be identified within multiple deployed environments. Similarly, in FIG. 12, the normative specification of a deployed environment is exhibited in the consistency in behaviors within a specific view of feature space over four distinct months.

In step 502, the system is configured using a pre-defined and/or discovered set of behavioral primitives to be used during classification and correlation. These primitives represent known threat behaviors, scanning behaviors, and/or command and control behaviors of advanced persistent threats (APTs), such as botnets. The behavioral primitives are represented by an n-tuple within the behavioral feature space.

In step 503, collection and transformation of network data from sensors is performed. This step leverages the use of the DCM 401 to collect and transform data and send the data to the BAM 402. As illustrated in more detail in FIG. 19, raw sensor data (router data) is transformed into a Network Flow Record 801.

In step 504, behavioral analysis is performed. In this step, network behaviors are derived over multiple time bins and collected in the BFSM 403. The BAM 402 then derives behaviors from the transformed data 801 into a Contact Behavioral Feature Vector 810 captured within multiple time bins (810*a*, 810*b*, 810*c*, 810*d*).

Steps 503 and 504 are described in more detail below with respect to FIG. 6.

In step 505, multiple classification and correlation modules contained in the CCE 404 are used to process the BFSM behavioral data to identify emergent threat patterns and groups of related threats. The scores measured by the CCE modules are captured in the contact behavior score vector 820, whose structure is illustrated in FIG. 18 and includes classified behavior 1 (821), classified behavior 2 (822), etc.

In step 506, new threat behaviors and threats are discovered and input into the KDM 405.

In step 507, behavioral trust is derived from classification score vectors. Behavioral trust within the method and systems described herein are subjective in nature and are driven by parameters provided by the operational environment.

In step 509, the threats are reported to the TID 408 and the TIM 409.

In a parallel step 508, the threats and their behaviors are shared with other detection nodes 400*c*, providing a distributed defense capability. Threats are first transformed into a common format before they are delivered to other nodes connected to the current node 400*b* and 400*c*.

In step 510, an analyst can use the TAM 410 to analyze the network behaviors to perform the following tasks: manual detect emergent threat behaviors that are input to the KDM 405, review and verify threat behaviors, manual detect threats that are input to the KDM 405, review and verity detected threats, and review interfaces TID 408 and the TMM 409.

Figure 9:
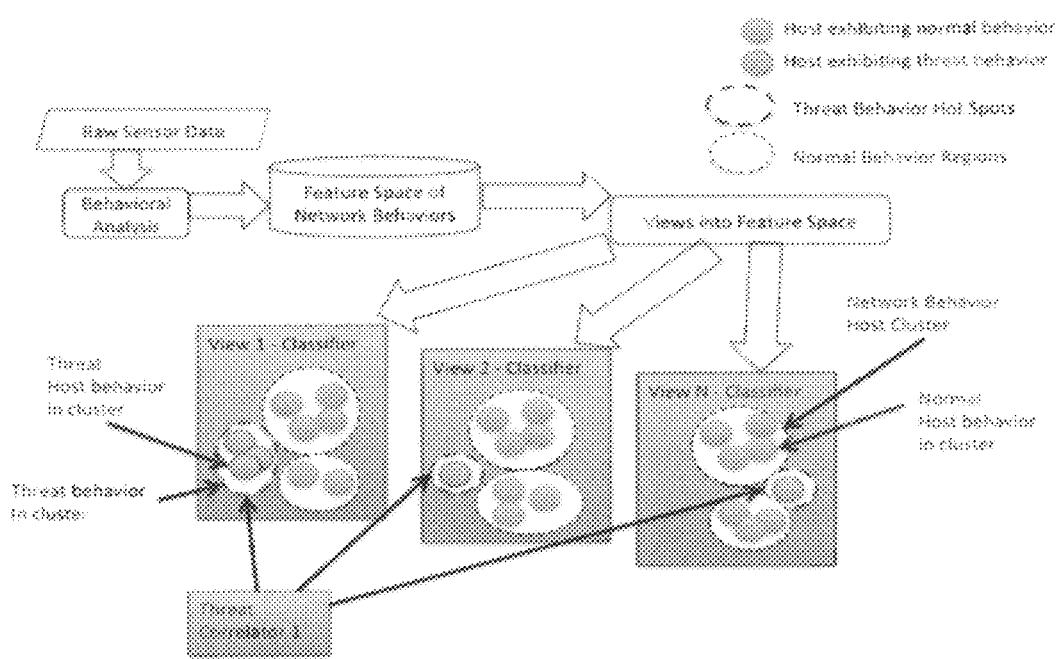
FIG. 9 is a diagram illustrating the internal representation of the CCE in terms of a set of views into the behavioral feature space.
Figure 10:
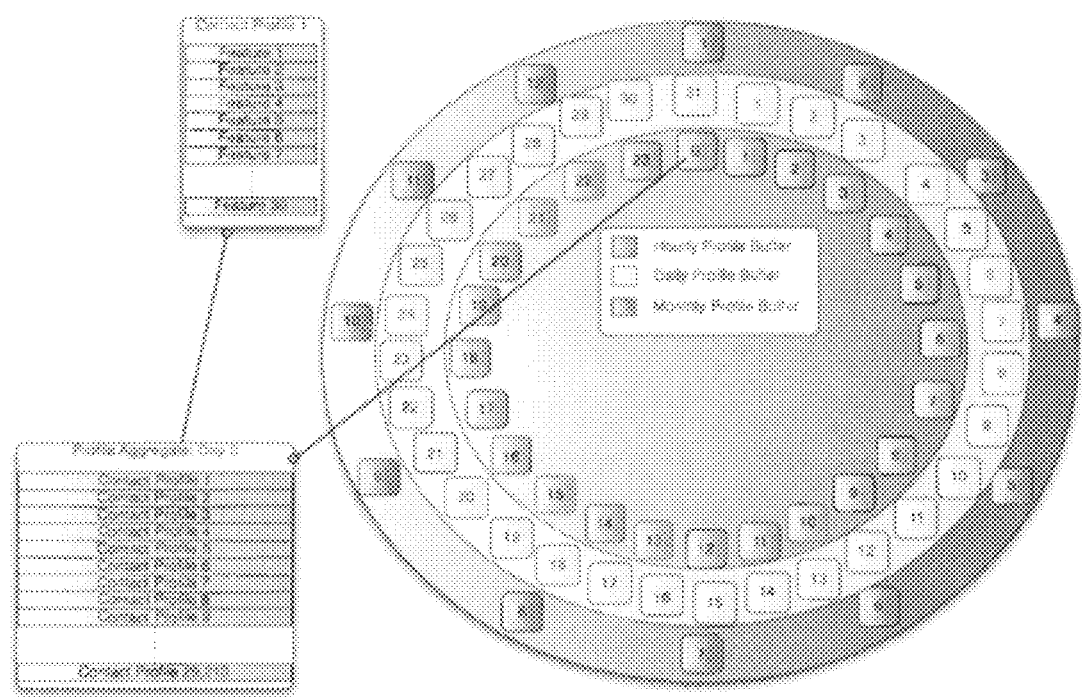
FIG. 10 is a diagram illustrating internal time buffers within the behavioral temporal engine used to manage network behaviors over multiple time periods.

As an example, in January, 2009 a Chinese host within a deployed environment was found to be communicating with a known asset behind a firewall, as illustrated in FIG. 11. As depicted in FIG. 3, in this example, network communication data from 102 was ingested and transformed into network flow records (801 in FIG. 19) by the DCM 401. Behavioral features were then derived from the network flow records 801 using the BAM 402 and stored in the BFSM 403. Two specific behavioral features were then analyzed within the BFSM 403: average packets per flow, and average bytes per flow. These two behavioral features represent a 2-tuple behavioral feature vector, or view of the feature space, as shown in FIG. 9. The CCE 404 then utilized a CCE module tuned for data exfiltration (CCE.ExfiltrationModule 404.2) that measured distance between regions within the features space for outliers, also taking into account data exchange and geo-location. The Chinese host contact is an outlier, with a large distance between most other Chinese hosts. As seen in using this specific view of the overall feature space, most Chinese hosts are found to the bottom left of FIG. 11.

Data Collection, Behavioral Aggregation, Privacy Enhancement Data Sharing

Figure 5:
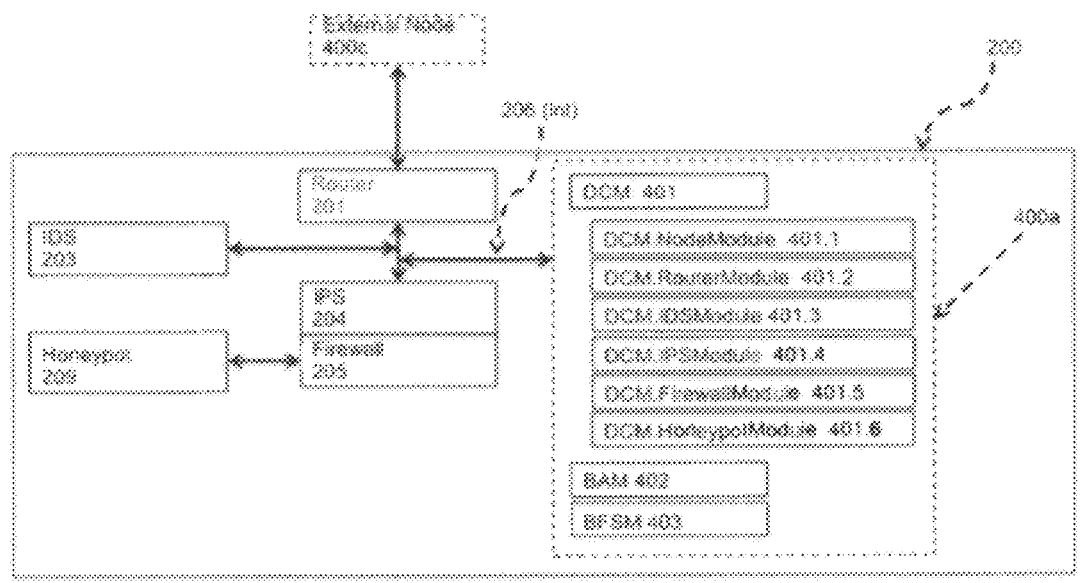
FIG. 5 is a system diagram illustrating the data collection module (DCM)

One aspect of this embodiment is the flexibility of ingesting heterogeneous data sources, allowing for the derivation of a rich behavior feature space managed in the BFSM 403 and stored in a structure 810 represented in FIG. 18. An overview of the data collection system deployed in network architecture (200) ingesting data from an external detection node 400*a* is illustrated in FIG. 5. This type of system configuration provides a distributed defense capability used to share privacy-enhanced data in the form of contact behavior feature vector 810, contact behavior score vector 820, and trust 830. Sharing temporally aggregated contact information, without identity, is unique to this embodiment and reduces the overhead of data passed between systems.

In the system of FIG. 5, raw data is ingested from a series of one or more sensors that create both events from the Internet 101, distributed nodes 400c, and the internal network 206. Sensors include routers 201, IDS 203, honeypot 209, firewalls 205, Intrusion Prevention Systems (IPS) (204) and internal computers 207. In the system of FIG. 3, physical sensor technology, such as Card Key Systems 301, Intelligent Video Surveillance 302, and Telecommunication technology 303 can be integrated into the system that can be found in the DMZ portion of the network (208).

The Data Collection Module (DCM) 401 monitors network systems by collecting and transforming data and events from a number of network devices, including devices 201, 203, 204, 205, 209, and 400c. The DCM 401 collects network flow data over communication channels, such as 102, from devices such as routers 201. The structure of the network flow data 801 is illustrated in FIG. 15. As an example, the DCM 401 can also collect security events from routers 201, IDS 203, and honeypots 209. The DCM 401 internally translates the raw data, normalizing it into respective internal structural representations: Network Flow record 801, IDS Alert 802, Honeypot Attack Data 803, as illustrated in FIGS. 15, 16, and 17. Further, the DCM can collect contact behavior features 810 from other nodes 400b,c.

Sensor data is collected and transformed through a series of DCM sensor modules tuned for each sensor type. For example, the DCMRouterModule 401.2 is tuned for parsing Network Flow records data and transforming that data into an internal network flow format 801, which is then ready for behavioral analysis by the BAM 402. This transformation step normalizes and aligns proprietary data formats in order to facilitate behavioral analysis and fusion. During this transformation, the data is made threat-centric by rolling the data up to a known threat, e.g. host, or creating a new contact if one does not exist. Also, the behavioral data is privacy enhanced by removing the Internet address from the behaviors, and providing a unique, anonymous identification.

The DCM 401 monitors physical systems by collecting and fusing data and events from a number of physical devices. The DCM 401 collects building and room entry events from Card Key Systems 301. The DCM 401 collects video artifacts and events from Intelligent Video Surveillance device 302. Further, the DCM 401 collects data from asset tracking systems 303, such as National Automatic Identification System (NAIS).

Figure 19:
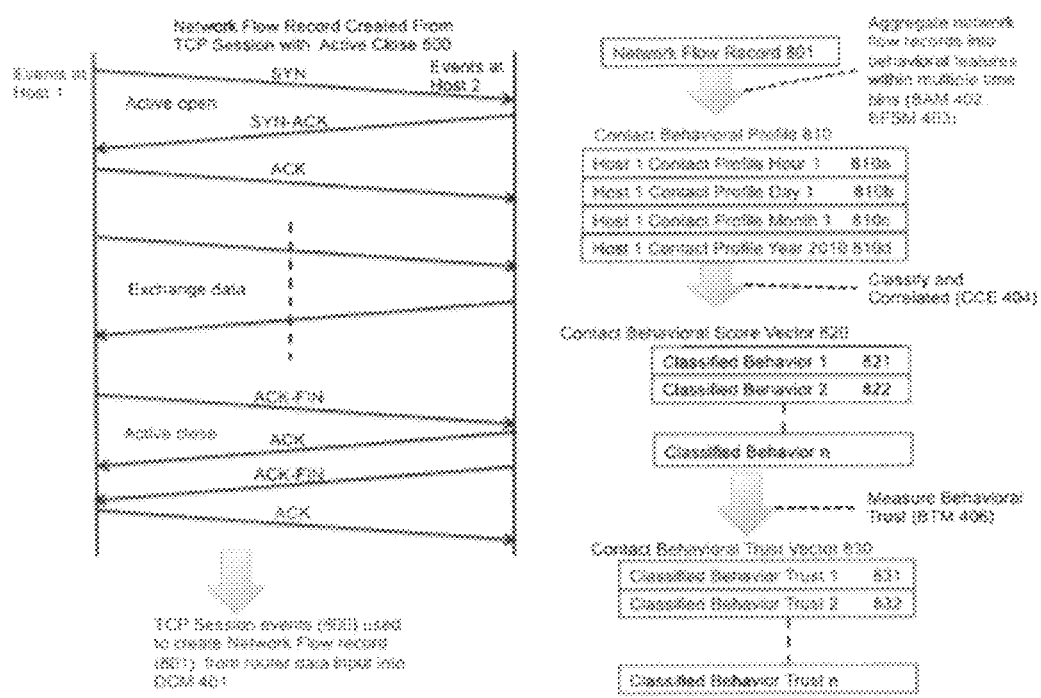
FIG. 19 illustrates how network flow data is processed through data collection, behavioral analysis, classification/correlation, and trust derivation.

The behavioral aggregation module BAM 402 processes data input from the data collection modules and aggregates behaviors per threat by transforming the normalized sensor data 801, 802, 803 into a Contact Behavioral Feature Vector (CBFV) 810. Each time bin within the temporal behavioral process contains a different set of CBFV 810 (e.g., hour 810a, day 810b, month 810c, and year 810d), as illustrated in FIG. 19.

Network behaviors are derived from a number of sensors operating over various computer communications channels. For example, network flow behaviors include features such as bytes per flow, packets per flow, tcp_flags, initial_flag, packet entropy of flow, inter-arrival time between packets in flow, variance of bytes sent/received during time interval, variance of packets in time interval, types of scan behavior exhibited by threat, types of malware delivered by threat, and bytes sent/received by host in another country.

Figure 6:
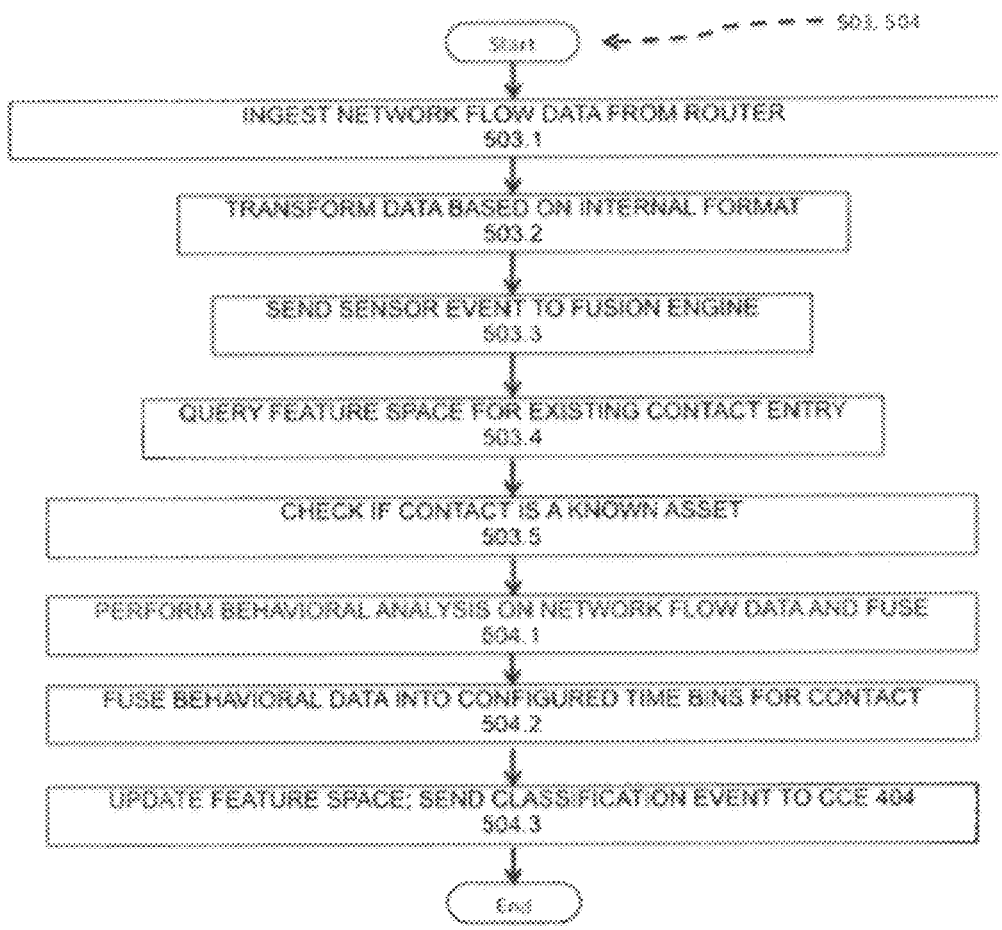
FIG. 6 is a method diagram capturing the DCM methodology.

The steps performed by the DCM 401 are shown in FIG. 6 and correspond to steps 503 and 504 in FIG. 4. The DCM 401 transforms raw data captured from low-level sensors 201, 203, 204, 205, 209, 400c into a semantically consistent structure, which allows the BAM 402 to aggregate the data into the behavioral features space. Transformation is facilitated through a sensor mapping ontology provided and managed by the KDM 405). Sensor data transformation modules are installed in the DCM 401 (401.1, 401.2, 401.3, 401.4, 401.5, 401.6). The sensor mapping ontology serves to map and transform various attributes of proprietary sensor formats into a common format.

Network data and events originating from multiple sensor types are ingested into the system in step 503.1 through the use of various sensor modules 401.1-401.6.

In step 503.2, the sensor data is transformed into a format allowing for behavioral aggregation, thus becoming a sensor event.

In step 503.3, the sensor event, which originates in the DCM, is passed to the fusion system for analysis.

In step 503.4, the feature space is queried to see if the current contact, e.g., host, is being tracked by the fusion system. If not, a new contact is created.

In step 503.5, the contact is then checked to see if it is a known asset, by querying the asset management module AMM 411. This allows for the identification of threats to assets that can affect the health of business processes within an organization and its supporting supply chains. By identifying threats and threat behaviors to assets, and leveraging the mapping of business processes supporting by one or more network assets, the risk associated with a business process or mission can be measured. Risk is then a function of contact behavioral feature vector (CBFV) 810, contact behavioral score vector (CBSV) 820, contact behavioral trust score vector (CBTSV) 830, and business process asset mapping performed in the MPMM 412.

In step 504.1, aggregated behavioral analysis is performed on the contact. This creates an n-dimensional feature vector that defines the various aggregated behaviors of the contact.

In step 504.2, the behaviors derived from the sensor event are then fused to the configured time bins within the behavioral features space.

In step 504.3, the feature space, BFSM 403, is updated and a classification event is sent to the CCE 404.

Classification and Correlation

Figure 7:
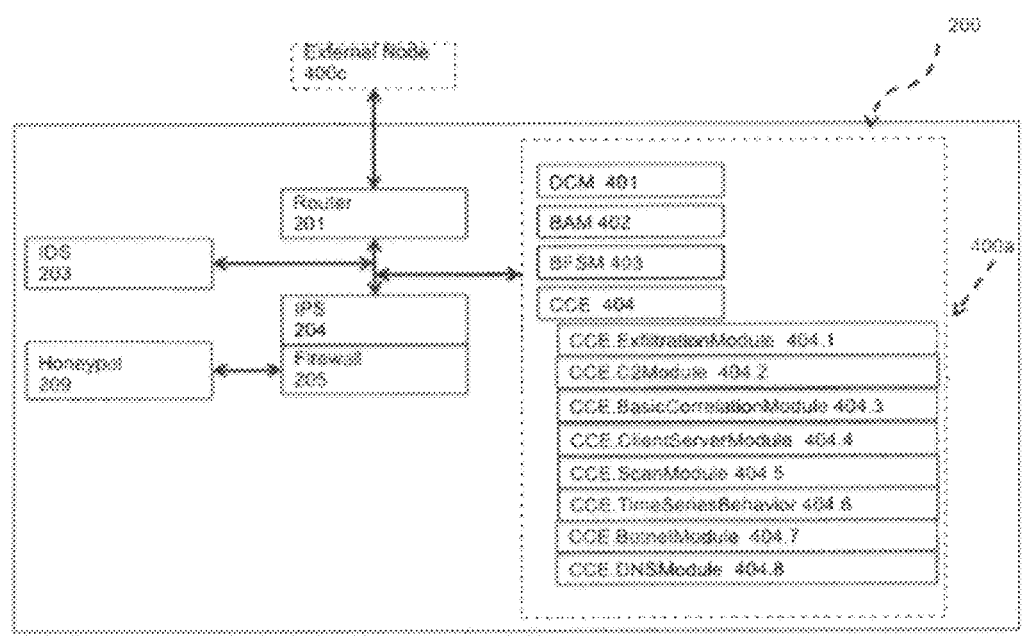
FIG. 7 is a system diagram illustrating the embodiment of the classification and correlation engine (CCE)

FIG. 7 illustrates the Classification and Correlation Engine (CCE) 404 deployed within a network architecture (200). In the embodiments disclosed herein, the CCE classifies and correlates contacts, e.g., hosts, rather than raw data or sensor events originating from a contact. The embodiments process contact behaviors independent of their identity. Such a methodology supports privacy enhancement enabling distributed defense capabilities.

Classification and correlation occurs in the CCE 404 using a concurrent set of modules. The CCE employs a varied number of plug-in modules tuned for specific types of threats and threat behaviors including the modules 404.1-404.9 shown in FIG. 7. The CCE using a unique dynamic cascading processing mechanism that chooses a set of CCE modules based on the initial context derived by contact behaviors.

The CCE 404 employs a cascading and layered mechanism. The CCE modules used in the lower layers are used to detect primitive behaviors exhibited by contacts to be analyzed in the CCE. These CCE modules tend to be statistically based using a clustering mechanism, support vector machines, and principle component analysis. The CCE modules employed at the upper layers of the CCE 404 use rule-based and model-based mechanisms applying syntactic pattern recognition techniques based on multiple behavioral primitives exhibited by contacts.

Each CCE module has a specific view into the behavioral feature space module BFSM 403 that includes a vector of behavioral features, e.g., byte variance, byte per flow, and packet per flow, as illustrated in FIG. 9. Within a specific view of the feature space there are known regions having hot spot activity and normal activity. Essentially, the CCE modules measure the distance, using various types of algorithms, between a contact's current behaviors and these known regions.

Each CCE plug-in module (404.1-404.N) processes a feature vector of contact behavioral data retrieved from the BFSM 403. This tuple of information used by the CCE plug-in represents a specific "view" into the feature space, as shown in FIG. 9. Within this view of the feature space, there are known regions and unknown regions. Both known and unknown regions are broken down into various regions identified by both behavioral metrics, and then with trust metrics. Previously unknown or emergent behavior can be measured by the relative distances of known behaviors, and also by regional measures.

Each known and unknown region is given two different types of metrics: a behavioral metric and a trust metric. The behavioral metric is relatively objective and used to measure the accuracy and degree of behavior known to exist in those regions. The trust metric is subjective and linked to the enterprises security policies.

A tuple of behaviors is a subset of the total behavioral feature space. A CCE plug-in uses 1 to N behaviors within the overall feature space to process contacts. These modules use a combination of asset configuration information (AMM 411) and run-time heuristics to make measurements of the trust associated with a contact.

Each CCE plug-in module (404.1-404.N) can be grouped together in cascading processing hierarchies. When one plug-in module detects a specific type of behavior, it can be forwarded to another module based on those specific results.

Each CCE plug-in module is initialized during a learning phase during the initial deployment of the system in a new environment. After the initial learning phase, the system gradual updates known and unknown regions.

Figure 8:
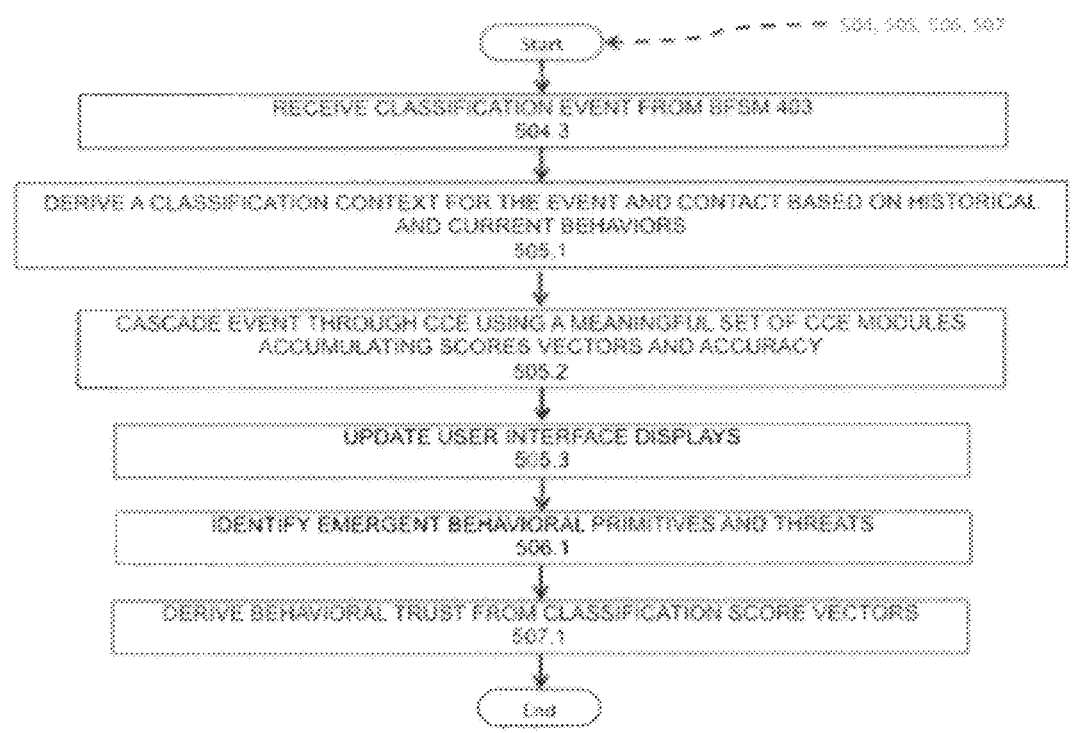
FIG. 8 is a method capturing the CCE methodology for classifying and correlation contacts: hosts and host groups.

The steps performed by the CCE 404 are shown in FIG. 8.

In step 504.3, classification and correlation is initiated from an event delivered by BFSM 403. This classification event contains a behavioral feature vector that is processed by the various modules within the CCE 404.

In step 505.1, after the event is received, a classification context is derived from basic behaviors to determine: (1) if the contact is an asset, (2) how many days in a month the contact has visited, (3) is the contact acting as a client or server, and/or (4) is the contact involved in small or large data transfers per unit time. This context is used to assemble a set of classifiers and correlators to then process the event.

In step 505.2, the event is then processed by the set of CCE modules using various types of classifiers: statistical-based, model-based, rule-based, and time-series.

In step 505.3, the user interface displays are updated. The results from the BAM 402, CCE 404, and the BTM are displayed in the user interfaces modules TID 408, TMM 409, and the TAM 410. Further, the risk analysis results from RMM 413, AMM 411, and MPMM 411 are managed by the user interfaces TID 408, TMM 409, and TMM 409. For example, contacts are displayed in real-time (online) or post-analysis (offline). The user interfaces are used to indicate anomalies using context-sensitive annotation layered on top of both the behavioral and geographic visualizations of contacts in the TID 408. Tabular views of contacts are used to manage the contacts. Visualizations are used to map contacts to assets in order to assess risk to business processes in the MPMM 411. The mitigation of threats and risk to assets is done through a number of different methods using tables, charts, and geographic visualizations in the TMM 409.

In step 506.1, emergent behavioral primitives and threats are identified. Emergent behaviors represent a cluster of common activity within the behavioral feature space that has not been previously identified by the system. A behavioral primitive is mathematically represented as an n-tuple of features along with distance vectors surrounding the n-dimensional point in the feature space representing known activity, known as threat behaviors and normal behavior regions in FIG. 9. In FIG. 11, there are both normal behaviors and threat behaviors annotated within a behavioral visualization of a specific view of the feature space based on Log(Byte Avg) vs. Log(Packet Avg).

In step 507.1, behavior trust is derived from classification score vectors. Behavioral trust within the method and systems described herein are subjective in nature and are driven by parameters provided by the operational environment. These parameters represent numeric values configured by a system administrator to tune the environment to the specific security policies of the institution. For example, an institution may reduce the trust parameter associated with two-way communication outside the US to unknown hosts using multiple network prototypes, e.g. TCP, UDP, and ICMP. Each known behavioral primitive has a multiple trust parameter driven by the behavior itself, but also, the source of the behavior (e.g., US, Non-US).

Sensor and Behavioral Mapping Using Ontology

Figure 14:
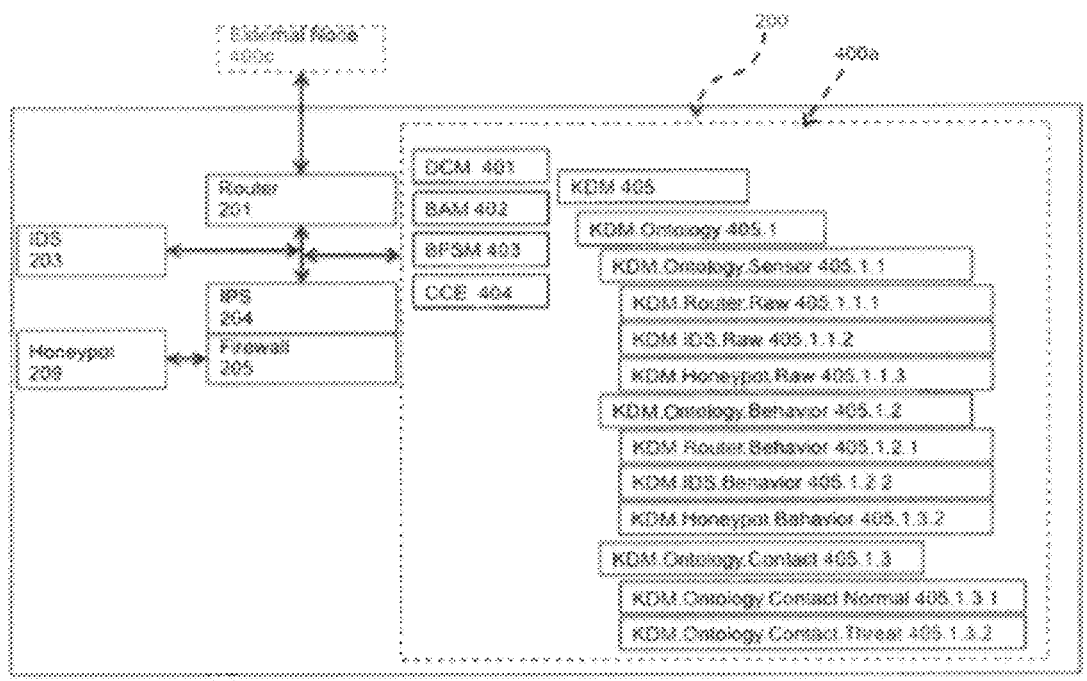
FIG. 14 illustrates the KDM modules of the KDM 405.

In order to adapt to increasingly dynamic cyber threats, the embodiments described herein use Ontology 405.1 contained in the KDM 405 deployed within a network architecture (200), as shown in FIG. 14. The Ontology is broken down into three portions: Ontology Sensor Mapping Modules 405.1.1, Behavioral Modules 405.1.2, and Contact Behavior Mappings 405.1.3.

The security threats are decomposed into quantifiable behavioral primitives. These behavioral primitives are captured by the KDM 405 using ontology. These behavioral primitives are then be aligned to various sensor data and events. The ontology serves to map sensor data to specific behavioral features, and then to map the behavioral features to known types of contacts: botnets, data exfilteration, web servers, and clients, etc.

One example of an ontology sensor mapping module is the KDM.Router.Raw module 405.1.1.1. This module is used to transform router network flow data into an internal network flow mapping. The mapping is then used to extract behavioral features into the feature space BFSM 403. Another example is the KDM.IDS.RAW module 405.1.1.2. This part of the ontology is used to map intrusion detection events from sensors such as Snort and Bro IDS into a normalized format.

The temporal-behavioral analysis system disclosed herein efficiently and reliably monitors network traffic for unauthorized network usage, providing a unique capability for privacy enhancement. Consequently, the temporal-behavioral analysis system has applicability in the fields of network monitoring, network security, malicious insiders, distributed network defense and similar fields.

Embodiments disclosed herein are implemented using a computer system. The computer system includes a bus or other communication mechanism for communicating information, and a processor coupled with the bus for processing the information. The computer system 1 also includes a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system further includes a read only memory (ROM) or other static storage device (e.g., programmable ROM (PROM), erasable PROM (EPROM), and electrically erasable PROM (EEPROM)) coupled to the bus for storing static information and instructions for the processor.

The computer system also includes a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, or any other medium from which a computer can read.

Stored on any one or on a combination of computer readable media, the present invention includes software for controlling the computer system, for driving a device or devices for implementing the invention, and for enabling the computer system to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor for execution. A computer readable medium may take many forms, including but not limited to, non-volatile media, and volatile media. Non-volatile media includes, for example, optical, magnetic disks, and magneto-optical disks, such as the hard disk or the removable media drive. Volatile media includes dynamic memory, such as the main memory.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system may receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface, which carry the digital data to and from the computer system 1201 maybe implemented in baseband signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system can transmit and receive data, including program code, through the network(s) and, the network link and the communication interface. Moreover, the network link may provide a connection through a LAN to a mobile device such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method performed by a computer that has been programmed with instructions that cause the computer to function as a threat-monitoring device for determining, within a deployed environment over a data communication network, network threats and their associated behaviors, the method comprising:
   acquiring sensor data that identifies a specific contact;
   normalizing the acquired sensor data to generate transformed sensor data;
   deriving, for the specific contact from the transformed sensor data using temporal aggregation, a contact behavior feature vector for each of a plurality of time periods;
   determining, for the specific contact from the contact behavior feature vector, scores associated with each of a plurality of classification modules to form a contact score vector, the contact score vector being independent of an identity of the specific contact;
   identifying a type of the specific contact based on the contact score vector; and
   determining, by the threat-monitoring device, a threat type, based on the contact behavioral feature vector and the contact score vector, when the type of the specific contact is determined to be a threat in the identifying step.

2. The method of claim 1, further comprising:
   deriving, for the specific contact from the transformed sensor data, a measure of trust and a measure of risk.

3. The method of claim 1, wherein the acquiring step comprises:
   acquiring the sensor data that identifies the specific contact, the specific contact being one of a host, a host group, a network, an autonomous system, and a country.

4. The method of claim 1, wherein the identifying step comprises identifying the type of the specific contact, the type being one of normal, abnormal, threat, and unknown.

5. The method of claim 1, further comprising:
   deriving a behavioral trust vector based on the contact score vector;
   calculating a measure of trust of the specific contact based on the derived behavioral trust vector; and
   calculating a measure of risk to business processes, based on the contact score vector and identified threats to assets that are used by the business processes.

6. The method of claim 1, further comprising:
   determining whether the specific contact is an asset within the deployed environment or whether the specific contact is external to the deployed environment; and
   determining a set of trust and risk metrics based on whether the specific contact is the asset within the deployed environment or is external to the deployed environment.

7. The method of claim 1, wherein the normalizing step comprises:
   formatting the acquired sensor data into a predefined format; and
   removing address information from the acquired sensor data, and associating a unique, anonymous identification with the sensor data.

8. A monitoring device for determining, within a deployed environment over a data communication network, network threats and their associated behaviors, the monitoring device comprising:
   a processor configured to
      acquire sensor data that identifies a specific contact;
      normalize the acquired sensor data to generate transformed sensor data;
      derive, for the specific contact from the transformed sensor data using temporal aggregation, a contact behavior feature vector for each of a plurality of time periods;
      determine, for the specific contact from the contact behavior feature vector, scores associated with each of a plurality of classification modules to form a contact score vector, the contact score vector being independent of an identity of the specific contact;
      identify a type of the specific contact based on the contact score vector; and
      determine a threat type, based on the contact behavioral feature vector and the contact score vector, when the type of the specific contact is determined to be a threat.

9. The monitoring device of claim 8, wherein the processor is further configured to derive, for the specific contact from the transformed sensor data, a measure of trust and a measure of risk.

10. The monitoring device of claim 8, wherein the processor is configured to acquire the sensor data that identifies the specific contact, the specific contact being one of a host, a host group, a network, an autonomous system, and a country.

11. The monitoring device of claim 8, wherein the processor is configured to identify the type of the specific contact, the type being one of normal, abnormal, threat, and unknown.

12. The monitoring device of claim 8, wherein the processor is further configured to:

derive a behavioral trust vector based on the contact score vector; and calculate a measure of trust of the specific contact based on the derived behavioral trust vector.

13. The monitoring device of claim 8, wherein the processor is further configured to:

determine whether the specific contact is an asset within the deployed environment or whether the specific contact is external to the deployed environment; and determine a set of trust and risk metrics based on whether the specific contact is the asset within the deployed environment or is external to the deployed environment.

14. A non-transitory computer-readable medium storing a computer program, which when executed by a computer, causes the computer to determine, within a deployed environment over a data communication network, network threats and their associated behaviors by performing the steps of:

acquiring sensor data that identifies a specific contact;

normalizing the acquired sensor data to generate transformed sensor data;

deriving, for the specific contact from the transformed sensor data using temporal aggregation, a contact behavior feature vector for each of a plurality of time periods;

determining, for the specific contact from the contact behavior feature vector, scores associated with each of a plurality of classification modules to form a contact score vector, the contact score vector being independent of an identity of the specific contact;

identifying a type of the specific contact based on the contact score vector; and determining a threat type, based on the contact behavioral feature vector and the contact score vector, when the type of the specific contact is determined to be a threat in the identifying step.

* * * * *